US006625085B1

(12) United States Patent
Eo et al.

(10) Patent No.: US 6,625,085 B1
(45) Date of Patent: Sep. 23, 2003

(54) UNIVERSAL TIMEPIECE FROM WHICH LATITUDE AND LONGITUDE CAN BE DETERMINED

(75) Inventors: Yoon-hyoung Eo, Seoul (KR); Jang-sung Choi, Gunpo-si (KR)

(73) Assignee: Timespace System Co. Ltd., Seongnam-si (KR)

( * ) Notice: Subject to any disclaimer, the term of this patent is extended or adjusted under 35 U.S.C. 154(b) by 0 days.

(21) Appl. No.: 09/958,882

(22) PCT Filed: Jun. 17, 1999

(86) PCT No.: PCT/KR99/00311

§ 371 (c)(1),
(2), (4) Date: Oct. 17, 2001

(87) PCT Pub. No.: WO00/70410

PCT Pub. Date: Nov. 23, 2000

(30) Foreign Application Priority Data

May 19, 1999 (KR) ........................................ 99/18044
May 19, 1999 (KR) ........................................ 99/18045

(51) Int. Cl.[7] ........................ G04B 19/26; G04B 19/22; G01L 17/34; G09B 23/00

(52) U.S. Cl. ............................ 368/15; 368/21; 33/269; 434/284

(58) Field of Search .............................. 368/15–20, 21, 368/27; 33/268, 269; 434/284, 285, 290

(56) References Cited

U.S. PATENT DOCUMENTS 2,394,226 A 2/1946 Baldocchi
2,467,360 A 4/1949 Young
2,921,386 A 11/1960 Stefano
3,003,258 A 10/1961 Stefano
3,248,866 A 5/1966 Spilhaus
3,858,334 A 1/1975 Eisenhauer
4,731,767 A * 3/1988 Uehara ........................ 368/15
5,457,663 A * 10/1995 Mejaski ........................ 368/15
5,701,678 A * 12/1997 Wang .......................... 33/268

* cited by examiner

*Primary Examiner*—Vit Miska
(74) *Attorney, Agent, or Firm*—Staas & Halsey LLP

(57) ABSTRACT

A universal timepiece from which a latitude and a longitude can be determined. A bottom plate which has the names of the main cities in the world, scales and the relative longitudes according to the real longitudes of the cities on the circumference thereof, is included. Comprised is a circular hour plate which has a 24-divisional scale having the same angles with respect to the center. And a circular star plate which rotates 360.99 per 24 hours is included. The rotational axis coincides with the Polaris or the south pole and the main stars and a concentric circle for representing the declination are designated in the star plate. At each concentric circle, the declination or the value obtained by subtracting the declination from 90 is recorded. The clock plate rotates to indicate the time. The star plate is the timepiece which rotates in the same velocity with the actual celestial sphere. The timepiece of the present invention can be utilized as the universal timepiece and the rotation of the earth can be indirectly observed regardless of day and night. The latitude, the longitude and the present time can be advantageously and correctly appreciated.

7 Claims, 5 Drawing Sheets

UNIVERSAL TIMEPIECE FROM WHICH LATITUDE AND LONGITUDE CAN BE DETERMINED

BACKGROUND OF THE INVENTION

1. Field of the Invention

The present invention relates to a universal timepiece from which a latitude and a longitude can be determined and more particularly, to a universal timepiece from which a latitude, a longitude and the present time can be correctly appreciated even at unknown place.

2. Description of the Prior Art

According to circumstances, there's a moment when you should appreciate a position and the present time at that position only with a timepiece and without any special measuring tools. For example, when one meets a shipwreck on a vast expanse of water or one fells behind in a back region, can be illustrated. At this time, measuring methods of the position and the time is known as follows. However, one should memorize a correct difference between the region where his timepiece has been adjusted and the Greenwich mean time for the application of this method.

First, a simple protractor is made for measuring the angles of 45 and 22.5, and the angle between the horizontal line from the present position and the Polaris, that is, the altitude of the Polaris, is measured using the protractor. If the position is southern hemisphere, the altitude of a star representing the south pole of the celestial sphere, is measured. The altitude of the Polaris coincides with the north latitude at that place and the altitude of the south pole of the celestial sphere coincides with the south latitude at that place. Therefore, the latitude at that position can be determined.

Next, the sunrise time and the sunset time are measured for determining the length of day and determining the culmination time of the sun by adding the half of the length of the day to the sunrise time. Then, the culmination time of the sun at that position is transformed to the Greenwich mean time and then subtract 12 from the transformed value. Through crossing thus obtained time value with 15 /hour, the longitude at the position can be obtained.

According to the above-mentioned method, the latitude, the longitude and the present time can be determined by using a common timepiece. However, it is difficult to utilize this method because of the following reasons. One should remember correctly the time difference between the time where the timepiece has been adjusted and the Greenwich mean time. And the altitude of the Polaris should be measured correctly. In addition, the calculation is very complicated. Therefore, this method is rarely utilized in case of emergency.

SUMMARY OF THE INVENTION

Accordingly, it is an object of the present invention to solve the problems of the conventional method and providing a universal timepiece of which possession is advantageous and from which the latitude, the longitude and the present time at an unknown place, can be immediately appreciated without any additional operation or complicated calculation.

To accomplish the above-mentioned object, there is provided in the present invention a timepiece having a star plate for measuring the latitude and the longitude during night.

There also is provided in the present invention a timepiece having a measuring bar or a measuring hole for measuring the longitude during day.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Hereinafter, preferred embodiments of the present invention will be explained in more detail with reference to the accompanying drawings.

The structure and the utilizing method for the timepiece having the star plate will be explained and then, the specific matters for the timepiece having the measuring bars or the measuring holes will be explained while omitting the common part.

Explanation on the Timepiece Having the Star Plate

Figure 1:
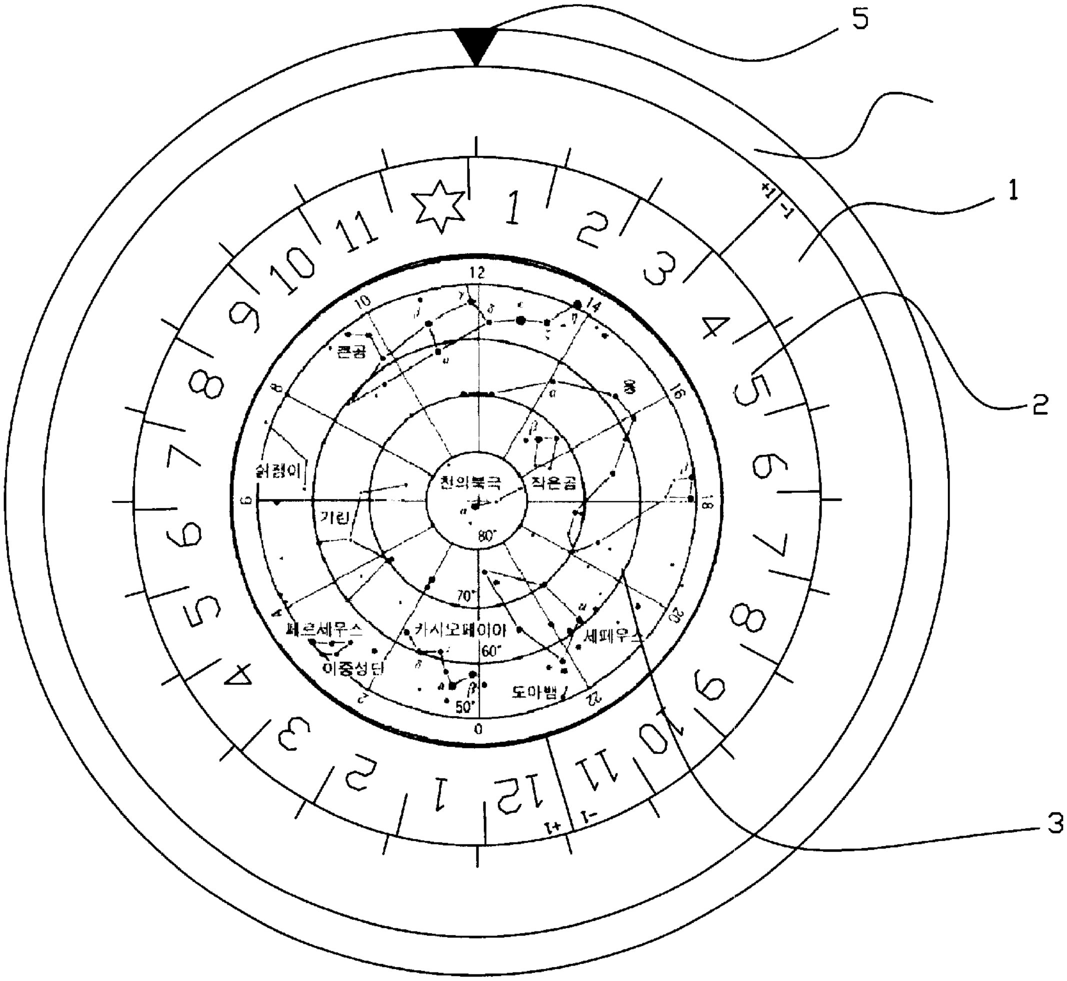
FIG. 1 illustrates one embodiment for the combination of each plate of the timepiece according to the present invention.
Figure 2:
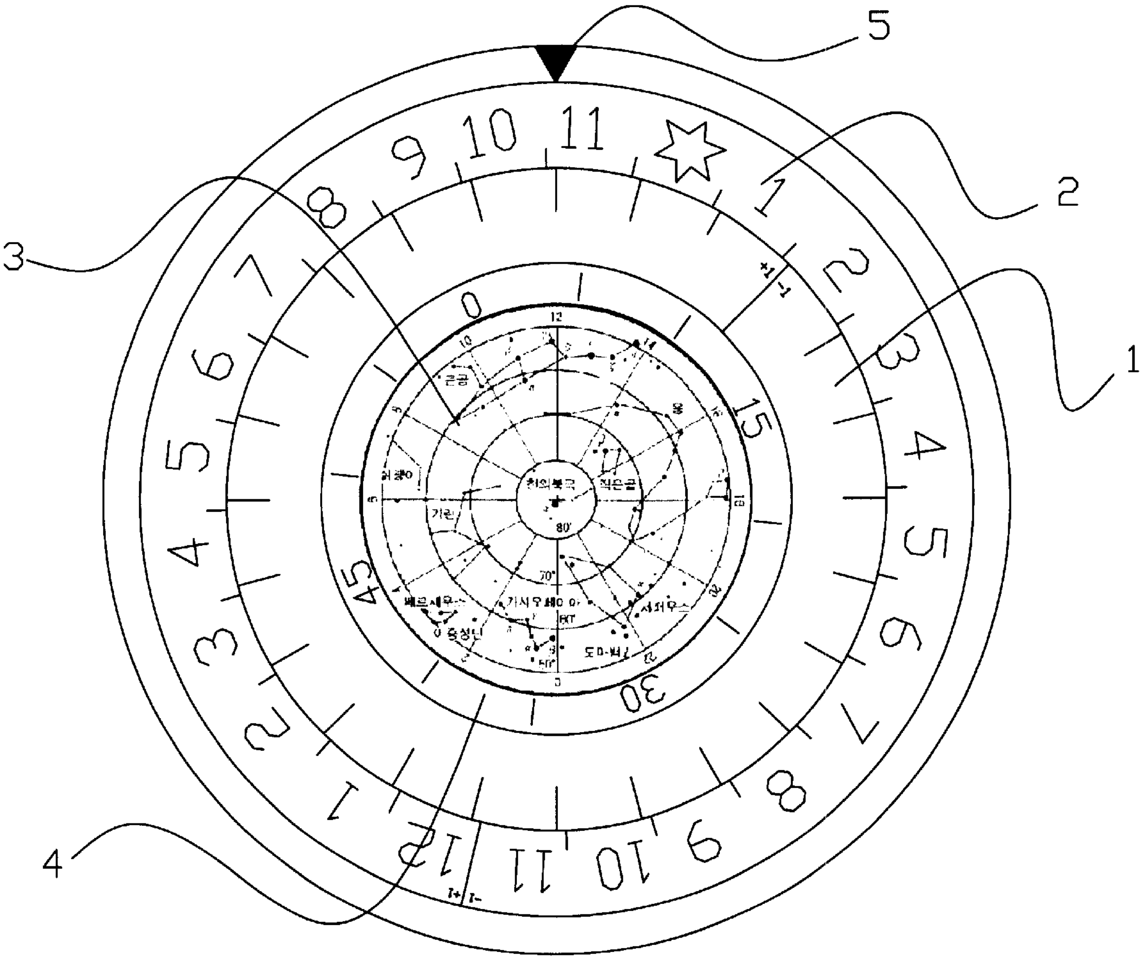
FIG. 2 illustrates another embodiment for the combination of each plate of the timepiece according to the present invention.
Figure 3:
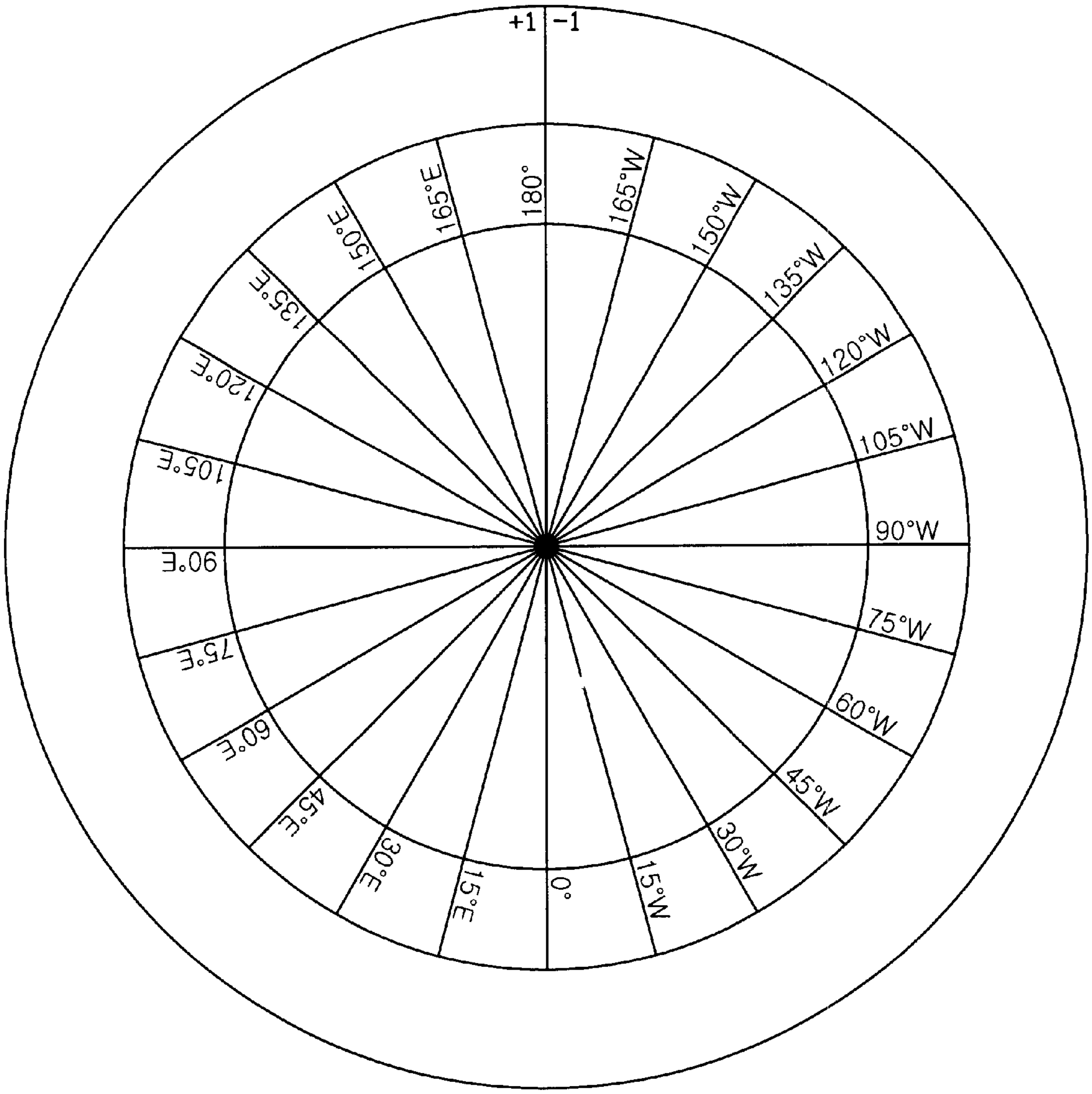
FIG. 3 illustrates an example of a bottom plate which can be applied to the timepiece of the present invention.

The timepiece of this embodiment according to the present invention comprises a bottom plate 1 for designating the names of the main cities in the world, scales and relative longitudes according to the actual longitudes of the cities on the circumference of bottom plate 1 where an international date line is indicated, a circular hour plate 2 which rotates once per 24 hours and has a 24-divisional scale having the same angles with respect to a center point thereof and a circular star plate 3 which rotates 360.99 per 24 hours, of which rotating axis coincides with the Polaris or the south pole while main stars are designated with a concentric circle representing a declination. The declination or a value obtained by subtracting the declination from 90 is recorded on the concentric circle. The time is indicated by the rotation of the clock plate and star plate 3 rotates at the same rotational velocity with the actual celestial sphere (see FIGS. 1, 2 & 3).

The timepiece of the present invention can additionally include a circular minute plate 4 which rotates once per hour and has a 12-divisional scale having the same angles at the end portion of the plate.

Different from the timepiece of the present invention, the common timepiece is provided with hands of the timepiece such as an hour hand, a minute hand and a second hand, and the hour hand rotates two times per day, the minute hand rotates 24 times per hour and the second hand rotates once per minute. However, the timepiece of the present invention has no hands. Instead of the rotation of the hands, an hour plate 2 divided into 24 sections, rotates once per day for indicating a specific hour, and a minute plate 4 divided in 12 sections, rotates once per hour for indicating a specific minute. The specific time can be appreciated by reading the numeral on hour plate 2 and minute plate 4 coincident with a time deciphering line 5 which is indicated on the case of the timepiece or a glass cover. At this time, minutely divided separation lines can be indicated between each separated section as occasion needs, for determining or reading correctly the specific minute using only hour plate 2.

At each divided scale or between the divided scales on hour plate 2, the numerals from 1 to 24, or the numerals from 0 to 12 and continuously from 1 to 11 can be designated. For illustrating ante meridian hours and post meridian hours, the numerals from 0 to 12 corresponding to the ante meridian hours and the numerals from 1 to 11 corresponding to the post meridian hours can be designated with different colors. For another case, a red dot which means the sun, may be designated instead of the numeral 12 for immediately appreciating the culmination time of the sun, that is, the noon.

The rotation of hour plate 2 can be a continuous analog-type or digital-type rotation in which hour plate 2 rotates by one scale per hour. The divided scales on minute plate 4 of the present invention can be designated by the numerals of 0, 10, 20, . . . 50 or by the numerals of 0, 15, 30 and 45, as occasion needs.

The terms of 'clockwise' and 'counterclockwise' mean the rotational direction of the hands and the opposite direction thereof for the common clocks in this specification.

The rotational directions of hour plate 2 and minute plate 4 can be optionally determined. When each plate rotate counterclockwise, the order of the designating numerals of hour plate 2 and minute plate 4 should be clockwise, while each plate rotate clockwise, the order of the designating numerals of the hour and the minute plates should be counterclockwise. Accordingly, the rotational directions of the plates can be the same clockwise direction or the same counterclockwise direction. Of course, hour plate 2 and minute plate 4 can rotate to the opposite direction. However, when hour plate 2 rotates counterclockwise, the cities positioned in the west on a bottom plate 1 should be positioned counterclockwise, and when hour plate 2 rotates clockwise, the cities positioned in the west on bottom plate 1 should be positioned clockwise.

The size of hour plate 2 may be larger or smaller than that of minute plate 4. And bottom plate 1 can be small enough for being provided at the inner portion of hour plate 2 or minute plate 4. However, the preferred position of bottom plate 1 is the outermost portion and star plate 3 is always provided at the inner portion of the clock plate.

The rotational velocity of star plate 3 in the present invention can be calculated as following.

The revolution degree of the earth per day, is about 0.99(=360_365). During the revolution, the earth rotates once. When regarding the sun as the center point of the revolution, the earth should proceed about 0.99 to complete one rotation. Therefore, the time for one rotation of the earth with respect to a fixed star is faster by about 3.9 minutes(= 0.99×60 minutes_15) than the time for one rotation of the earth with respect to the sun. Accordingly, the celestial body of night rises and sets 3.9 minutes ahead of the time per day. Then, the rotational velocity of star plate 3 can be determined as 360.99 per hour and the phenomena of the rises and sets of the stars ahead of time, may be correctly represented by star plate 3 in the timepiece of the present invention.

In the present invention, bottom plate 1 can be fixed or rotatable by a manual operation. When bottom plate 1 rotates, hour plate 2 and star plate 3 should keep an interlocking state for the correct rotations to the same degrees. The present minute at the main cities represented on bottom plate 1 is always constant and so minute plate 4 and bottom plate 1 does not keep the interlocking state.

Meantime, each scale lines on bottom plate 4 is extended to the center point of bottom plate 4 for the correct comparison of the rotational degree of star plate 3 with respect to the north pole (or south pole) of the celestial sphere, and the east longitude and the west longitude are preferably designated for the scale lines with 0 as the center.

The method for determining the latitude, the longitude and the present time at an unknown place by using the timepiece having the above-described constitution according to the present invention, will be described. For the sake of the convenient explanation, it is regarded that each plate in the timepiece rotates counterclockwise and bottom plate 1, hour plate 3, minute plate 4 and star plate 3 are arranged in this order from the outer portion (minute plate 4 is not shown in FIG. 4).

First, the present time at a specific city, for example, Seoul or Tokyo is adjusted to the scale of Seoul Tokyo on bottom plate 1 by controlling hour plate 1 and minute plate 4. At this state, hour plate 2 and minute plate 4 rotate to a predetermined velocity to indicate the present time of each city corresponding to the scale illustrated on bottom plate 1. Accordingly, a user can immediately appreciate the present time of the main cities in the world without making any operation from the timepiece of the present invention.

If the user moves from Seoul to Seattle, the present time at Seattle is the indicating time of the scale corresponding to Seattle on bottom plate 1. Therefore, any operation is not needed. Only for the visual convenience, the rotation of bottom plate 1 along with hour plate 2 is allowed so that the scale corresponding to Seattle indicates 0 o'clock direction. The 0 o'clock direction does not mean the direction of the timepiece in the present invention, but means the direction of the common timepiece of which hour hand rotates twice per day.

Meantime, the latitude of a circum polar(a star never set below the horizontal line during the rotation of the celestial sphere) is constant within a predetermined concentric circle irrespective of the season. Accordingly, if a star above the northern horizontal line in a night sky, is found in star plate 3, the declination (=90−latitude) of the star can be determined. In other words, from the declination of the star located above the northern horizontal line at a predetermined place, the latitude can be calculated. If there's no star above the northern horizontal line or even if the star located above the northern horizontal line can be found, the identity of the star cannot be validated from star plate 3, the latitude at that place can be determined as follows.

The distance between the Polaris and the Big Dipper (or the Cassiopeia) and the distance between the Polaris and the northern horizontal line are measured and from the distance between the Polaris and the Big Dipper(or the Cassiopeia) and the distance ratio of these two distances, a concentric circle is drawn on star plate 3 to determine the declination or the latitude. On the concentric circle of star plate 3, the latitude may be designated and the designation of the declination may remain.

From the above-described method, the latitude at the unknown place can be relatively correctly determined. The longitude and the present time can be confirmed as follows.

The north portion of the celestial sphere at the unknown place and the table of constellations on star plate 3 are compared. The position of the star in the celestial body at that point of time is constant. However, the position of the star seems to change depending on the observing position. When the northern stars on the celestial body are observed from two different positions, it seems that the stars rotate in proportion to the difference of the two longitudes. For example, a star of the Big Dipper is found at west 45 position in the celestial coordinate at Hong Kong of which east longitude is 120, star is found at west 75 at Guam of which east longitude is 150 which can be obtained by adding 45 at Hong Kong and the difference of the longitude 30 between these two places. This difference is not resulted from the rotation of the celestial sphere itself but is resulted from the difference of the observing positions. The position of the star at unknown place can be obtained by the following formula.

$$S2=S1-(E2-E1)$$

At this time, S2 represents the position of the star at the unknown place and is represented by the rotational degree of star plate 3, S1 represents the position of the star at a specific place and is represented by the rotational degree of star plate 3, E2 represents the east longitude at the unknown place and E1 represents the east longitude at the specific place. The direction of the eastward, that is, the counterclockwise direction is represented as +. Accordingly, the east longitude at the unknown place is represented by the following formula.

$$E2=E1-(S2-S1)$$

At this time, S2–S1 is the difference of the observed rotational angles between the unknown place and the specific place. The position of the star and the east longitude at the specific place are designated in the timepiece of the present invention. Therefore, the longitude of the unknown place can be determined by the actual rotational direction and rotational degree of the star from the star in star plate 3, that is, the rotational degree of star plate 3 at the unknown place. And the present time can be appreciated by reading hour plate 2 and minute plate 4 which coincide with the longitude. In fact, the longitude and the time of the scales on bottom plate 1 corresponding to the rotational degree become the longitude and the present time at the unknown place.

In order to correctly validate the angle between the star at star plate 3 and the real star, a second star plate 3 which has the same shape, the same size and the same rotational axis and optionally rotates, can be provided with the timepiece of the present invention. Through the coincidence of second star plate 3 with the constellation at the observing place, the rotational angle between star plate 3 and second star plate 3 can be advantageously and correctly obtained.

Explanation on the Timepiece Having the Measuring Bars or the Measuring Holes

Figure 4:
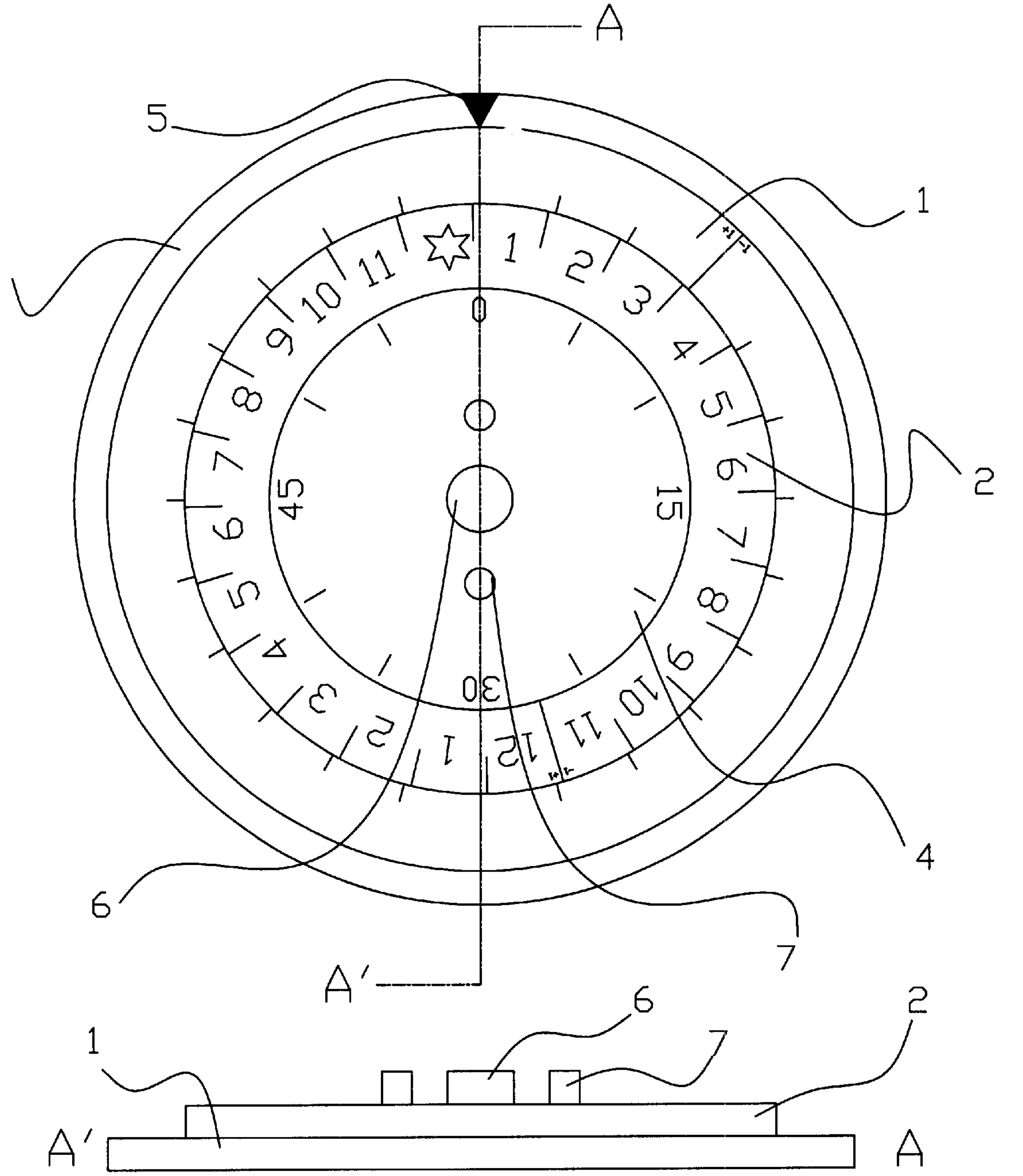
FIG. 4 illustrates a planar view and a cross-sectional view for the combination of each plate of one embodiment according to the present invention.

The object of the present invention can be accomplished by a timepiece comprising a bottom plate 1 on which the names of the main cities of the world, scales and longitudes are designated on relative positions according to the actual longitudes of the cities on the circumference having the international date line; a circular hour plate 2 which rotates once per 24 hours and has a 24-divisional scale having the same angles with respect to the center at the end portion thereof; a level 6; and two measuring bars 7 installed at 0 o'clock direction and 6 o'clock direction at about the inner center portion of the glass plate of the timepiece and is perpendicular to the bottom plate (see FIG. 4).

Figure 5:
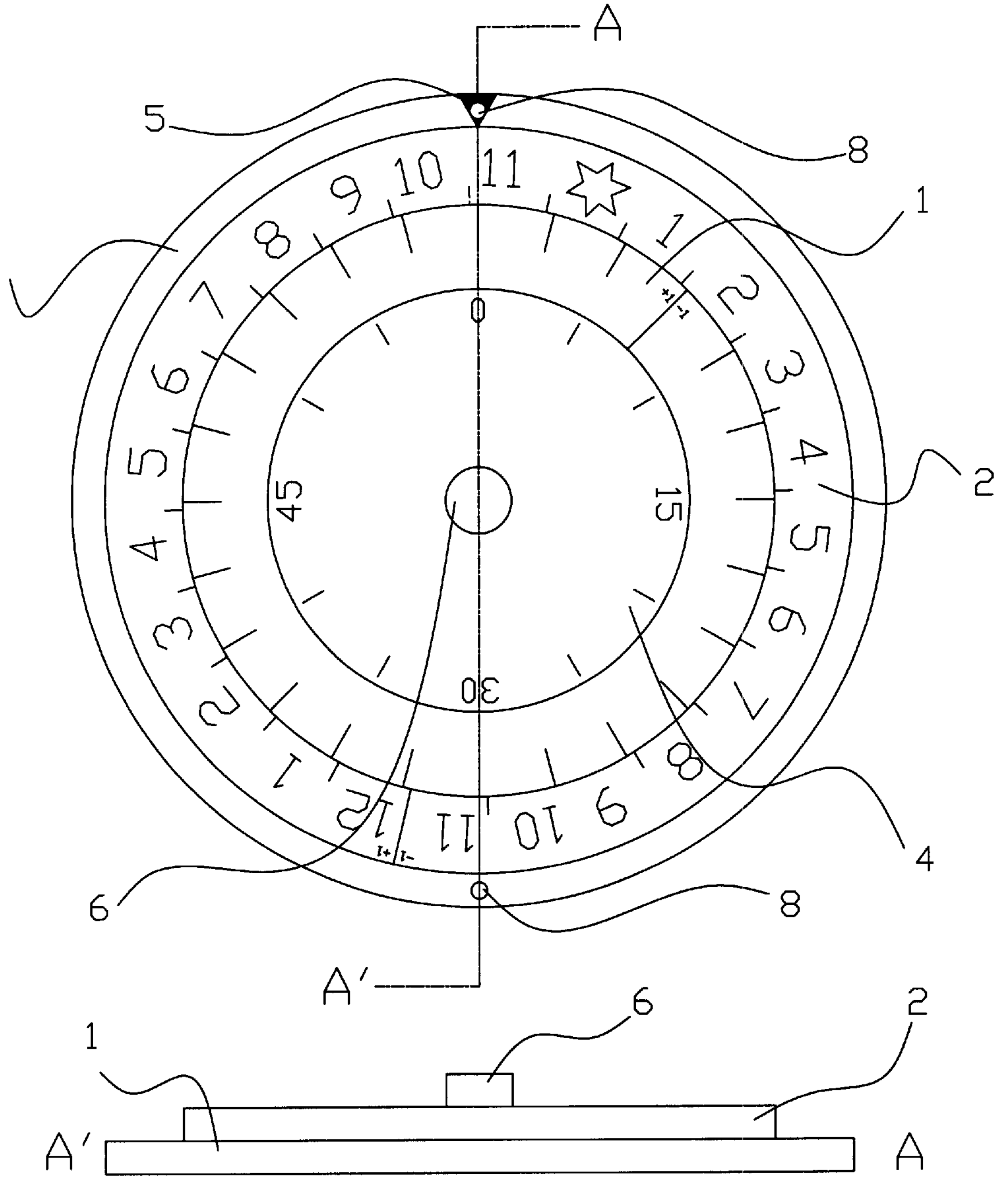
FIG. 5 illustrates a planar view and a cross-sectional view for the combination of each plate of another embodiment according to the present invention.

The object of the present invention also can be accomplished by a timepiece comprising measuring holes 5 respectively formed at the case of the timepiece at 0 o'clock direction and 6 o'clock direction instead of measuring bars 7 of the timepiece (see FIG. 5).

The constitution and the operational functions of the timepiece having the measuring bars or the measuring holes will be described below. The common portion with the timepiece having the star plate will be omitted.

The timepiece of the present invention can further comprise a circular minute plate 4 which rotates once per hour and has a 12-divisional scale having the same angles at the end portion thereof.

In the timepiece having measuring bars 7 or measuring holes 8 according to the present invention, a level 6 is a device for controlling the timepiece of the present invention in parallel state with the horizontal line and an air-drop level 3 may be preferably applied. Level 6 can be positioned anywhere of the clock plate, however, the preferred position is the center portion of the clock plate considering a fine view and the convenience of a usage.

Measuring bars 7 or measuring holes 8 are used for correctly measuring south-north direction or east-west direction, and are installed at the center portion and respectively at 0 o'clock direction and 6 o'clock direction. Measuring bars 7 or measuring holes 8 can be additionally and respectively installed at 3 o'clock direction and 9 o'clock direction, as occasion needs.

The method for deciphering the longitude and the present time at an unknown place utilizing the timepiece of this embodiment according to the present invention, having the above-described constitution, will be explained in detail below.

For the sake of explanation, the plates of the timepiece of the present invention are regarded to rotate counterclockwise and bottom plate 1, hour plate 2, minute plate 4 and level 6 are placed in this order from the outer portion. Four measuring bars 6 are installed at 0, 3, 6 and 9 o'clock direction, respectively. Minute plate 4 is not shown in drawings.

First, the present time of a specific city, for example, Seoul or Tokyo, is adjusted by controlling hour plate 2 and minute plate 4 to the scale of Seoul Tokyo. At this state, hour plate 2 and minute plate 4 rotate in a predetermine velocity to indicate the present time of the cities corresponding to the scales formed on bottom plate 1. Accordingly, the user of the timepiece of the present invention may immediately determine the present times of the main cities of the world without any operation. If the user moves from Seoul to Seattle, the present time at Seattle is the indicating time of the scale corresponding to Seattle on bottom plate 1. Therefore, no operation is needed. Only for the visual convenience, the rotation of bottom plate 1 along with hour plate 2 is allowed so that the scale corresponding to Seattle indicates 0 o'clock direction.

At the sunrise time at an unknown place, the timepiece of the present invention is adjusted so that the shadows of measuring bars 7 of 3 o'clock direction and 9 o'clock direction lie in a straight line. At this time, 3 o'clock indicates the due east while 9 o'clock indicates the due west. When measuring holes 8 are formed instead of measuring bars 7, straight bars are inserted into measuring holes 8 perpendicularly thereto. And when no measuring bars 7 of 3 o'clock and 9 o'clock directions and measuring holes 8 is formed, the due east and the due west can be determined by using two separate straight bars. Then, the clock is adjusted so that 3 o'clock direction and 9 o'clock direction respectively indicates the due east and the due west.

In time at this position, the time when the shadows of measuring bars 7 positioned at 0 and 6 o'clock directions or straight bars inserted into measuring holes 8 coincide comes. This time is the culmination of the sun, that is, the noon. Therefore, the the longitude at this unknown place can be determined by reading the longitude scale on bottom plate 1, corresponding to the position corresponding to 12 o'clock of hour plate 2 at day. After that, the present time of this place can be determined from the numerals of hour plate 2 corresponding to the longitude.

The timepiece of the present invention includes bottom plate 1 in which the name of the main cities in the world, scales and the relative longitudes according to the longitudes of the cities, are designated on the circumference of bottom plate 1 where the international date line is designated, hour plate 2 which rotates once per 24 hours and star plate 3 on which the movement of the celestial sphere is correctly reflected. This timepiece can be used as the universal timepiece and the rotation of the celestial sphere can be indirectly observed irrespective of day and night. Further, the latitude, the longitude and the present time at an unknown place can be determined advantageously and correctly.

Although the preferred embodiment of the invention has been described only for the structure of the shape and the rotating velocity for each plate and the position of the level and the measuring bars or the measuring holes, it is understood that the present invention should not be limited to the preferred embodiment, but various changes and modifications can be made by one skilled in the art within the spirit and scope of the invention as hereinafter claimed. That is, the timepiece of the present invention can be operated by a mechanical manner through the combination of a driving apparatus and sawtooth having a predetermined rotational ratio. Further the recognition of the data from the timepiece of the present invention can be implemented through an electronic manner using a display device such as an LCD (liquid crystal display device) or a CRT(cathod ray tube).

Effect of the Invention

The timepiece of the present invention includes bottom plate 1 in which the name of the main cities in the world, scales and the relative longitudes according to the longitudes of the cities, are designated on the circumference of bottom plate 1 where the international date line is designated, hour plate 2 which rotates once per 24 hours and star plate 3 on which the movement of the celestial sphere is correctly reflected. This timepiece can be used as the universal timepiece and the rotation of the celestial sphere can be indirectly observed irrespective of day and night. Further, the latitude, the longitude and the present time at an unknown place can be determined advantageously and correctly.

What is claimed is:

1. A timepiece for indicating time through a rotation of clock plates, said timepiece comprising:

a bottom plate for designating names of main cities in the world, scales, and relative longitudes according to the actual longitudes of said cities on a circumference of said bottom plate where an international date line is indicated;

a circular hour plate, the end of which has a 24-divisional scale having the same angles with respect to the center thereof and rotates once per 24 hours; and a circular star plate which rotates 360.99 per 24 hours, wherein major stars of the celestrial north pole in line with the north or south pole are indicated on the rotational axis thereof in conjunction with of a concentric circle representing a declination, and said declination or a value obtained by subtracting said declination from 90 are recorded on said concentric circle.

2. A timepiece according to claim 1, comprising a circular minute plate, the end of which has a 12-divisional scale having the same angles with respect to the center thereto, and which rotates once per hour.

3. A timepiece according to claim 1, comprising a rotatable second star plate having the same shape, size, and rotational axis as those of said star plate.

4. A timepiece for indicating time through a rotation of clock plates, said timepiece comprising:

a bottom plate for designating names of main cities in the world, scales, and relative longitudes according to the actual longitudes of said cities on a circumference of said bottom plate where an international date line is indicated;

a circular hour plate which has a 24-divisional scale having the same angles with respect to the center thereof and which rotates once per 24 hours;

a level; and two measuring bars installed at 0 o'clock direction and 6 o'clock direction at about an inner center portion of a glass plate of said timepiece, perpendicularly to the bottom plate.

5. A timepiece according to claim 4, comprising a circular minute plate, the end of which has a 12-divisional scale having the same angles with respect to the center thereto, and which rotates once per hour.

6. A timepiece for indicating time through a rotation of clock plates, said timepiece comprising:

a bottom plate for designating names of main cities in the world, scales, and relative longitudes according to the actual longitudes of said cities on a circumference of said bottom plate where an international date line is indicated;

a circular hour plate which has a 24-divisional scale having the same angles with respect to the center thereof and which rotates once per 24 hours; and a level, measuring holes being respectively formed on a case of said timepiece at 0 o'clock direction and 6 o'clock direction.

7. A timepiece according to claim 6, comprising a circular minute plate, the end of which has a 12-divisional scale having the same angles with respect to the center thereto, and which rotates once per hour.

* * * * *